United States Patent [19]

Fayling

[11] 4,090,662
[45] May 23, 1978

[54] TAMPERPROOF MAGNETICALLY READABLE LABEL

[75] Inventor: Richard E. Fayling, White Bear Lake, Minn.

[73] Assignee: Minnesota Mining and Manufacturing Company, St. Paul, Minn.

[21] Appl. No.: 581,543

[22] Filed: May 28, 1975

[51] Int. Cl.² .................... G06K 19/00; G11B 25/04
[52] U.S. Cl. ........................................ 235/493; 360/2
[58] Field of Search ............... 235/61.11 D, 61.12 M; 360/2, 21; 179/100.2 MD

[56] References Cited

U.S. PATENT DOCUMENTS

| | | | |
|---|---|---|---|
| 2,550,803 | 5/1951 | Goddard | 360/21 |
| 2,712,572 | 7/1955 | Roberts | 360/21 |
| 3,219,353 | 11/1965 | Prentky | 235/61.12 M |
| 3,239,824 | 3/1966 | Hare | 360/21 |
| 3,328,195 | 6/1967 | May | 235/61.12 M |
| 3,566,356 | 2/1968 | Holm et al. | 340/149 |
| 3,627,934 | 12/1971 | Riddle | 360/2 |
| 3,683,413 | 8/1972 | Schlaepfer | 235/61.12 M |
| 3,760,123 | 9/1973 | Smaller | 235/61.12 M |
| 3,790,754 | 2/1974 | Black et al. | 235/61.12 M |
| 3,808,404 | 4/1974 | Riggs | 235/61.12 M |

FOREIGN PATENT DOCUMENTS 987,357   3/1965   United Kingdom ......... 235/61.11 D Primary Examiner—Daryl W. Cook
Attorney, Agent, or Firm—Cruzan Alexander; Donald M. Sell; Robert E. Granrud

[57] ABSTRACT

A magnetizable layer having an $H_c$ of at least 3000 oersteds pre-encoded with digital data is permanently bonded to the face of a document and has a permanent protective overlayer which, if magnetizable, has relatively low $H_c$ and can be used for recording transaction data.

13 Claims, 4 Drawing Figures

TAMPERPROOF MAGNETICALLY READABLE LABEL

FIELD OF THE INVENTION

This invention concerns magnetic recording media and more specifically documents such as credit cards having magnetic recording stripes.

BACKGROUND TO THE INVENTION

For many years there has been a need to encode documents with permanent, tamperproof, machine-readable digital data. For example, it is customary at ports of entry to check passport numbers against lists of stolen and revoked passports, a procedure which would be faster and more accurate if the numbers were machine readable and far more reliable if the machine-readable data were tamperproof and included information such as a code number or name which could not be visually detected. The rightful bearer would furnish the code when using the passport. Credit cards and cash cards involve essentially the same problem and additionally should be adaptable to the recording and reading of machine-readable data of a temporary nature concerning transactions in which the cards are used.

One solution to such need is disclosed in U.S. Pat. No. 3,566,356 (Holm et al.) wherein a document may include two superposed magnetizable layers, one of ordinary $H_c$ (300 oersteds) at the surface of the document and the other of relatively high $H_c$ (2000 oersteds). Although sophisticated techniques are required to selectively alter recorded data on such a document, the data can be altered and thus is not as tamperproof as may be required for certain uses.

THE PRESENT INVENTION

The present invention satisfies the need for documents encoded with machine-readable digital data which are virtually tamperproof without leaving visual evidence of the tampering. A document embodying the invention incorporates a subsurface layer magnetically encoded with digital data, which layer has more than 0.3 line of flux retentivity per cm of width, a thickness of no more than 60 micrometers and a high intrinsic coercive force, $H_c$, of at least 3000 oersteds. Permanently bonded to the subsurface layer is a surface layer which may be a nonmagnetizable layer or a conventional magnetic recording layer, or both. The thickness of the surface layer should be at least 5 micrometers, sufficient to prevent a conventional, high-permeability, laminated-core head having a saturation induction, $B_s$, of 7300 gauss in contact with the surface layer to effect erasure of more than 50% of the amplitude of the digital data signal in the subsurface layer. It is believed that such a surface layer should protect the data pre-encoded in the high $H_c$ layer from alteration with any magnetic recording head which is currently commercially available, especially if the surface layer is at least 15 micrometers in thickness. The thickness of the surface layer should not exceed 400 micrometers, preferably not more than 100 micrometers. Otherwise, it would be difficult to reliably read the data encoded in the high $H_c$ subsurface layer.

When the surface layer includes a conventional magnetic recording layer for recording temporary transaction data, its $H_c$ should be at least 150 oersteds so that it will not be unduly subject to accidental erasure. If its $H_c$ is about 1000 oersteds or higher, the conventional magnetic recording layer is preferably no thicker than 20 micrometers to enhance erasure. Whenever the conventional magnetic recording layer is less than 15 micrometers in thickness, it may be desirable to space it from the high $H_c$ subsurface layer by a nonmagnetizable layer to provide a composite surface layer of at least 15 micrometers in thickness to provide greater assurance against alteration of the data with which the high $H_c$ layer is encoded. In any event, the $H_c$ of the surface layer should not be so high that it retains any magnetic signal when subjected to a field which would be sufficient to erase magnetizable media of one-half the $H_c$ of the subsurface layer.

Because the $H_c$ of the surface layer is low compared to that of the high $H_c$ subsurface layer, it is herein referred to as the "low $H_c$ layer" even if its coercivity is 1500 oersteds or somewhat higher.

Whether or not the surface layer is capable of magnetic recording, it is preferably 15 micrometers in thickness, thick enough to prevent alteration of the pre-encoded data and thin enough to permit reliable readout of that data.

The high $H_c$ layer may be provided, for example, by coating a dispersion of barium ferrite particles in a solution of organic binder onto a plastic film such as biaxially-oriented polyethylene terephthalate film. A major proportion by weight of the nonvolatile ingredients of the mixture should comprise the ferrite particles to provide desirably high flux retentivity. After encoding the high $H_c$ layer of the resultant tape with digital data using known contact recording techniques with a magnetic head which is capable of recording on magnetizable material of such high $H_c$, the high $H_c$ layer is bonded to the end-use document. If the high $H_c$ layer formed a strong bond to the plastic film, the latter provides a permanent protective surface layer.

To provide the document with a conventional magnetic recording layer for recording transaction data, it is preferred to construct a multi-layer magnetic recording medium on a temporary carrier web such as a plastic film which either has easy release characteristics or a release coating. To this is applied a conventional low $H_c$ magnetizable layer, as by coating a dispersion of a magnetizable pigment such as acicular gamma-$Fe_2O_3$ or $CrO_2$ particles in a solution of an organic binder. After driving off the solvent and preferably crosslinking the binder to render it resistant to the solvent in the next coating, the high $H_c$ layer is coated onto the low $H_c$ layer. After magnetically encoding the high $H_c$ layer, it is laminated to the face of the document, and the temporary carrier web is removed to provide a permanent, virtually tamperproof label having a conventional magnetizable layer at the surface.

Preferably such a dual-layer medium is produced as a long tape adapted to be wound up in roll form for convenient storage, shipment and use. Before windup, a tack-free, heat-activatable adhesive coating may be applied over the high $H_c$ layer for convenience in bonding pre-encoded strips to documents to be labeled. The adhesive coating may be so thin as to be virtually unmeasurable so that digital data can be encoded on the high $H_c$ layer through the adhesive. After the label is securely in place and the temporary carrier web has been removed, the pre-encoded digital data should be safe from alteration by any commercially available magnetic recording apparatus, unless the label is delaminated to expose the high $H_c$ layer. Its low $H_c$ layer permits contact recording of transaction data in the same manner as on present-day magnetic-stripe credit cards.

When a document is thus labeled with superposed high and low $H_c$ layers, transaction data may be recorded on the low $H_c$ layer in areas where the high $H_c$ layer is not pre-encoded. Preferably, the data pre-encoded in the high $H_c$ layer extends over substantially the whole label, and the transaction data is superimposed directly over the pre-encoded data. This makes it impossible to transfer only the transaction data from one document to another by contact duplicating techniques which have been used to tamper with prior documents having only single magnetizable layers.

In order to read the data of each layer with minimal interference from data in the other layer, the flux transitions in one layer may extend at an angle of at least 10° to those of the other layer. For providing labels in the form of a magnetic-stripe such as is commonly used on credit cards, the high $H_c$ layer nay be pre-encoded along a track extending the length of the stripe but with the gap of the head rotated to extend 10°–60° to the crosswise direction of the stripe. With the flux transitions of the transaction data extending in the crosswise direction along the same track, the data in each layer can be read independently of the data in the other layer.

Instead of locating both sets of data along the same track and skewing the heads for one set of data, the two sets can be read independently if recorded on tracks crossing at an angle of at least 10°.

Whenever the high $H_c$ layer is pre-encoded and then bonded to the face of the document so that it must be read from the opposite side, its thickness should not exceed 60 micrometers, preferably no more than 25 micrometers. Otherwise there might be some difficulty in reading the pre-encoded data, especially if the surface layer is rather thick.

THE DRAWING

Figure 1:
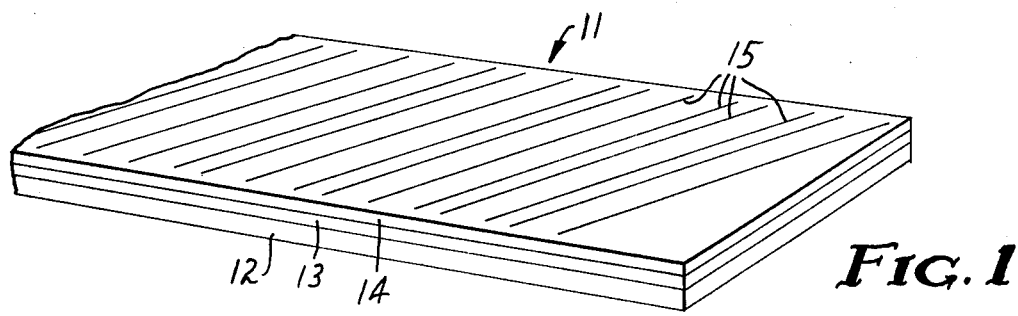
FIG. 1 is a schematic perspective view of a magnetic recording tape of the invention having two magnetizable layers including a high $H_c$ layer encoded with digital data.

The magnetic recording tape 11 shown in FIG. 1 includes a temporary carrier web 12, having a low-adhesion surface bearing a low $H_c$ layer 13 which may comprise magnetizable particles in an organic binder having an $H_c$ of 300–350 oersteds. Adhered in turn to the layer 13 is a high $H_c$ surface layer 14 which may also comprise magnetizable particles in organic binder but preferably has an $H_c$ of 3500 oersteds or more. The high $H_c$ layer 14 is pre-encoded with digital data extending along a track in the longitudinal direction of the tape, but with the flux transitions 15 skewed 25° to the crosswise direction.

Figure 2:
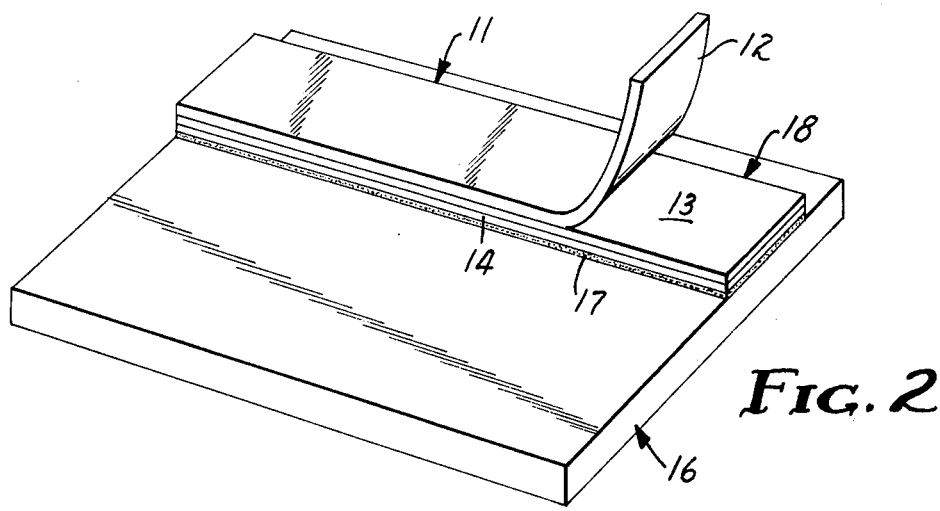
FIG. 2 is a perspective view of a document to which a strip of the pre-encoded recording tape shown in FIG. 1 is being applied to provide a machine-readable, tamperproof label in the practice of the invention.

Referring to FIG. 2, a strip of the pre-encoded tape 11 is laminated to a document 16 by an adhesive 17 permanently bonding the high $H_c$ layer 14 to the face of the document to provide a machine-readable, virtually tamperproof label 18. In doing so, sufficient heat and pressure may be applied so that the strip of tape, exclusive of the carrier web 12, is embedded so as to be nearly flush with the face of the document. The temporary carrier web 12 is then peeled away as illustrated in FIG. 2.

Figure 3:
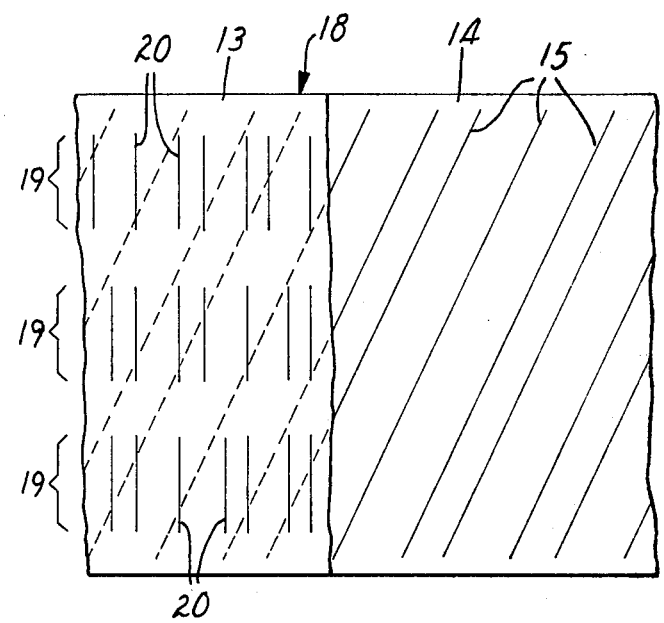
FIG. 3 is a fragmentary plan view of the label of FIG. 2 schematically illustrating digital data recorded on both magnetizable layers.

For purposes of illustration, the flux transitions 15 pre-encoded on the high $H_c$ layer 14 of the label 18 of FIG. 2 are shown in FIG. 3 by dotted lines, except where the low $H_c$ layer 13 is broken away. In use, the low $H_c$ layer 13 of the label 18 may be recorded in a series of three conventional longitudinal tracks 19 to provide crosswise flux transitions 20 representing transaction data. The head used to record on the low $H_c$ layer 13 is preferably driven at sufficiently low write-current so as not to have any effect whatsoever on the high $H_c$ layer 14.

Even though the tracks 19 are superimposed directly over the single track of pre-encoded data in the high $H_c$ layer 14, the data recorded in either layer can be reproduced independently of the data in the other layer. Since the flux transitions 15 in the high $H_c$ layer extend substantially across the label 18, the noise generated at the edges of the recording head during the recording of the high $H_c$ layer has no effect upon the reading of data recorded on the low $H_c$ layer 13.

Figure 4:
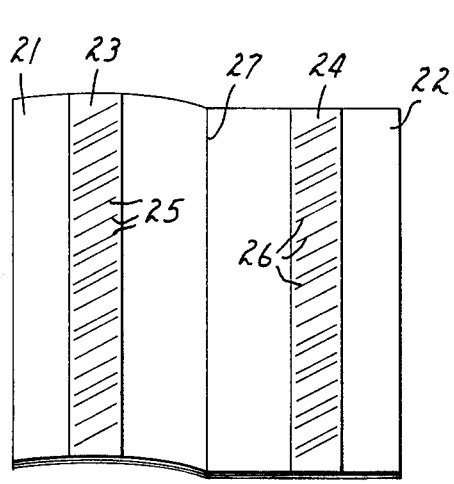
FIG. 4 schematically illustrates a document such as a passport wherein the high $H_c$ layer consists of two separately pre-encoded layers.

FIG. 4 illustrates two facing paper pages 21, 22 of a document such as a passport in the form of a booklet which folds at 27. Layers 23, 24 of high $H_c$ material are bonded to the pages 21, 22, respectively. Since each high $H_c$ layer is at the surface, it can be encoded with digital data. In each case, the flux transitions 25, 26 extend about 20° to the crosswise direction of the layers 23, 24, respectively. After coating each page with adhesive, the two pages 21, 22 are folded along the line 27 and permanently bonded together with one high $H_c$ layer superimposed over the other to provide a tamperproof label. Since the flux transitions of the data pre-encoded on one of the layers extend at an angle of 40° to those of the other, the digital data on each high $H_c$ layer can be reproduced independently of that pre-encoded on the other.

Even if apparatus later becomes available for magnetically altering digital data pre-encoded on a high $H_c$ layer that is covered by protective surface layer of at least 5 micrometers in thickness, it would be almost inconceivable that the same feat could be accomplished with respect to the label created as described in connection with FIG. 4. Suppose that all of the pre-encoded data could be cleanly erased and that one set of the flux transitions could be recorded on the dual high $H_c$ layer through one of the pages 21 or 22, a very difficult undertaking. A far greater accomplishment would be the recording of a second set of flux transitions extending 40° to the first set without disrupting the first set. To further frustrate any such scheme, the thickness of each of the high $H_c$ layers 23, 24 preferably does not exceed 15 micrometers.

EXAMPLE

A machine-readable, tamperproof label was made starting with a roll of hot-stamp magnetic recording tape which is presently in commercial use for applying magnetic recording stripes to vinyl resin card stock such as is used in credit cards and cash cards. Such a tape is commercially available from 3M Company under the designation MTA 23434. It consists of a biaxially-oriented film of polyethylene terephthalate as a temporary carrier web on which is coated a dispersion of acicular gamma-$Fe_2O_3$ particles in an organic binder. Over this coating is an ultrathin coating of a vinyl resin to improve the adhesion of the particulate layer to the vinyl resin card stock. This coating of vinyl resin is of no advantage for the purposes of this Example.

Over the vinyl resin coating of the hot-stamp tape was applied a dispersion of magnetizable barium ferrite particles in a solution of organic binder prepared by ball milling

|  | Parts by weight |
|---|---|
| Barium ferrite particles | 160 |
| Binder (60:40 blend of polyurethane elastomer and phenoxy resin, i.e., PKHH of Union Carbide Corp.) | 160 |
| Surfactant (phosphorylated ethoxylated long-chain alcohol) | 8 |
| Toluene | 80 |
| Methyl ethyl ketone | 80 |

Immediately prior to putting this dispersion into the coating tank, 10 parts by weight of a crosslinking agent was blended in, viz., "PAPI" sold by the Polychemical Division of Upjohn Company, which is polymethylene polyphenyl isocyanate having an average of 3.2 isocyanato groups per molecule. This dispersion was applied using a knife-coater at a 75-micrometer orifice, and the coating was passed through a flat magnetic field to orient the ferrite particles in the longitudinal direction, followed by heating to drive off the solvent and initiate crosslinking of the binder material. The resultant magnetic recording medium had two magnetizable layers, as follows:

|  | First Layer | Second Layer |
|---|---|---|
| Magnetic pigment | $\gamma$-$Fe_2O_3$ | Barium ferrite |
| Coating thickness | 13 micrometers | 13-18 micrometers |
| Intrinsic coercive force ($H_c$) | 300 oersteds | 3500 oersteds |
| weight % pigment | 75% | 75% |

After storing the dual-layer medium for a few days to allow the binder of the second coating to crosslink, a dilute solution of a vinyl resin (e.g., "VAGH" of Union Carbide Corporation) was knife-coated over the second coating to provide an adhesive layer that was so thin as to be virtually unmeasurable, but on the order of 0.25 micrometer in thickness. After slitting to widths of 1.27 cm to provide long dual-layer tapes, the tape was recorded with digital data using the two-frequency coherent phase recording method at a density of 30 bits per cm. The write head, which had a width of 6.3 mm, was skewed 20° from the crosswise direction while moving in contact with the high $H_c$ layer to provide a pattern of oblique flux transitions as illustrated at 15 in FIG. 1 of the drawing, except not extending substantially the full width of the tape.

Strips of the pre-encoded tape were hot-stamped onto vinyl resin card stock at temperatures of 160°-190° C, and the polyethylene terephthalate film (which acted as a carrier web) was peeled off as illustrated in FIG. 2 of the drawing to leave a label bearing pre-encoded digital data on the high $H_c$ layer. The exposed low $H_c$ layer was erased with a field having no effect upon the high $H_c$ layer and then recorded with digital data at 30 bits per cm using a write head having a width of 3 mm. With the gap of the write head extending in the crosswise direction, the label was moved past the write head along a track centrally of the track of digital data which had been pre-encoded in the high $H_c$ layer.

When using a read head 2 mm in width, the data recorded in the low $H_c$ layer reproduced with very little interference from the pre-encoded data in the high $H_c$ layer. With the gap of the same read head skewed 20°, the data encoded in the high $H_c$ layer was reproduced with very little interference from data in the low $H_c$ layer. In each case, the flux induced in the read head from the flux transitions extending at 20° to the gap was largely self-cancelling. Should one wish to change any of the three conditions, bit density, read head width or angle between flux transitions, compensating changes should be made in the other two in order to keep the interference to a minimum. The thickness of the surface layer must be taken into account when adjusting the bit density of the data in the high $H_c$ subsurface layer.

A magnetic recording medium having three consecutive layers of magnetizable particles has been used to provide virtually tamperproof labels for documents as follows:

Layer adjacent document: barium ferrite, 3500 oe., 13 micrometers in thickness

Intermediate Layer: cobalt-oxide-modified acicular $\gamma$-$Fe_2O_3$ particles, 1200 oe., 7 micrometers in thickness Surface layer: acicular $\gamma$-$Fe_2O_3$ particles, 300 oe., 7 micrometers in thickness.

The top two layers are useful for practicing the fraud-resistant techniques for magnetically recording digital data as disclosed in the above-mentioned U.S. Pat. No. 3,566,356 while the bottom layer carries the permanent pre-encoded data that is virtually tamperproof.

I claim:
1. A flexible magnetic recording medium comprising:
   a first layer substantially at the surface of the medium and having more than 0.3 line of flux retentivity per cm of width, a thickness of no more than 60 micrometers and an $H_c$ of at least 3000 oersteds, and permanently bonded to the first layer,
   a second layer which will not retain any magnetic signal when subjected to a field sufficient to erase magnetizable media of one-half the $H_c$ of the first layer and which has a thickness of 5–400 micrometers,
   a temporary carrier web to which the second layer is removably adhered, and
   when the first layer is pre-encoded with digital data and is bonded to a document, the second layer, after removal of the carrier web, protects the first from alteration of its pre-encoded digital data with a conventional head as herein defined.

2. Magnetic recording medium as defined in claim 1 wherein the second layer is nonmagnetizable.

3. Magnetic recording medium as defined in claim 1 wherein at least part of the second layer is magnetizable and has an $H_c$ of at least 150 oersteds to permit contact recording of transaction data on the second layer after the first layer has been bonded to document and the carrier web has been removed.

4. Magnetic recording medium as defined in claim 3 which is elongated and has its first layer encoded with digital data, flux transitions of which extend at an angle of 10°–60° to the crosswise direction of the elongated medium to permit such data and transaction data, which is recorded in the second layer with its flux transitions extending in the crosswise direction, to be read independently of the data in the other layer.

5. Magnetic recording medium as defined in claim 1 wherein the first layer comprises a major proportion by weight of ferrite particles in a minor proportion of organic binder.

6. Magnetic recording medium as defined in claim 1 having great length and wound upon itself in roll form from which strips of the medium may be encoded with digital data and dispensed for bonding to documents as permanent pre-encoded labels.

7. Method of incorporating permanent, tamperproof, machine-readable digital data into a document comprising the steps of
   (a) providing a high $H_c$ magnetizable layer having more than 0.3 line of flux retentivity per cm of width, a thickness of no more than 60 micrometers and an $H_c$ of at least 3000 oersteds,
   (b) magnetically contact recording said high $H_c$ layer with digital data,
   (c) permanently incorporating said recorded high $H_c$ layer into the document as a subsurface layer to which is permanently bonded a surface layer which will not retain any magnetic signal when subjected to a field sufficient to erase magnetizable media of one-half the $H_c$ of said recorded magnetizable layer and which has a thickness of 5–400 micrometers, thus protecting the digital data recorded in the high $H_c$ layer from alteration with a conventional head as herein defined.

8. Method as defined in claim 7 wherein step (a) involves providing two high $H_c$ layers, step (b) involves encoding each of said two layers with digital data, and step (c) involves permanently incorporating said two encoded high $H_c$ layers as subsurface layers of the document such that the flux transitions in one of the two layers overlie and extend at least 10° from the flux transitions in the other.

9. Method as defined in claim 7 wherein step (a) involves forming said high $H_c$ layer on a nonmagnetizable film to provide a permanent composite and step (c) involves bonding said high $H_c$ layer to the face of the document with the nonmagnetizable film of said composite at the surface.

10. Method as defined in claim 7 wherein step (a) involves coating onto a temporary carrier web a low $H_c$ magnetizable layer having an $H_c$ of at least 150 oersteds but not more than one-half the $H_c$ of said high $H_c$ layer, and then coating said high $H_c$ layer over said low $H_c$ layer to provide a magnetic recording medium having two magnetizable layers; step (c) involves laminating said magnetic recording medium to the face of the document with the high $H_c$ layer against the document; and an additional step (d) involves removing the temporary carrier web to expose the low $H_c$ layer to permit contact recording of transaction data on the low $H_c$ layer.

11. Method as defined in claim 10 wherein step (b) involves encoding said high $H_c$ layer with the flux transitions representing the digital data extending at an angle of at least 10° from a given direction to permit such data and transaction data, which is recorded in the low $H_c$ layer with its flux transitions extending in said given direction, to be reproduced independently of the data in the other layer.

12. A document encoded with permanent, virtually tamperproof machine-readable digital data including two layers, each having more than 0.3 line of flux retentivity per cm of width, a thickness of no more than 60 micrometers and an $H_c$ of at least 3000 oersteds and each encoded with digital data, the flux transitions of the data encoded in one of said two layers extending at least 10° to those encoded in the other to permit the data encoded in one of said two layers to be reproduced independently of data encoded in the other.

13. A document as defined in claim 12 wherein said two layers are both subsurface layers and a surface layer is permanently bonded to one of said two subsurface layers, which surface layer will not retain any magnetic signal when subjected to a field sufficient to erase magnetizable media of one-half the $H_c$ of the subsurface layers and has a thickness of 5–400 micrometers.

* * * * *